J. A. STONE.
TONGUE TRUCK.
APPLICATION FILED DEC. 19, 1913.

1,222,813.

Patented Apr. 17, 1917.

Witnesses:
C. C. Palmer
E. W. Burgess

Inventor:
John A. Stone.
by Chas. E. Lord
Atty.

UNITED STATES PATENT OFFICE.

JOHN A. STONE, OF CHICAGO, ILLINOIS, ASSIGNOR TO INTERNATIONAL HARVESTER COMPANY OF NEW JERSEY, A CORPORATION OF NEW JERSEY.

TONGUE-TRUCK.

1,222,813.  Specification of Letters Patent.  Patented Apr. 17, 1917.

Application filed December 19, 1913. Serial No. 807,586.

*To all whom it may concern:*

Be it known that I, JOHN A. STONE, a citizen of the United States, residing at Chicago, in the county of Cook and State of Illinois, have invented certain new and useful Improvements in Tongue-Trucks, of which the following is a full, clear, and exact specification.

My invention relates to tongue trucks and is designed for use in connection with harvesters and other implements, and comprises improved means whereby a lateral swinging movement of the steering tongue through an angle will turn the wheel in the same direction and at a greater angle.

The object of my invention is to provide an improved construction having few parts, which is strong and efficient in operation. This object may be obtained by various embodiments of my invention, among them being the mechanism illustrated in the accompanying drawings, in which—

Figure 1:
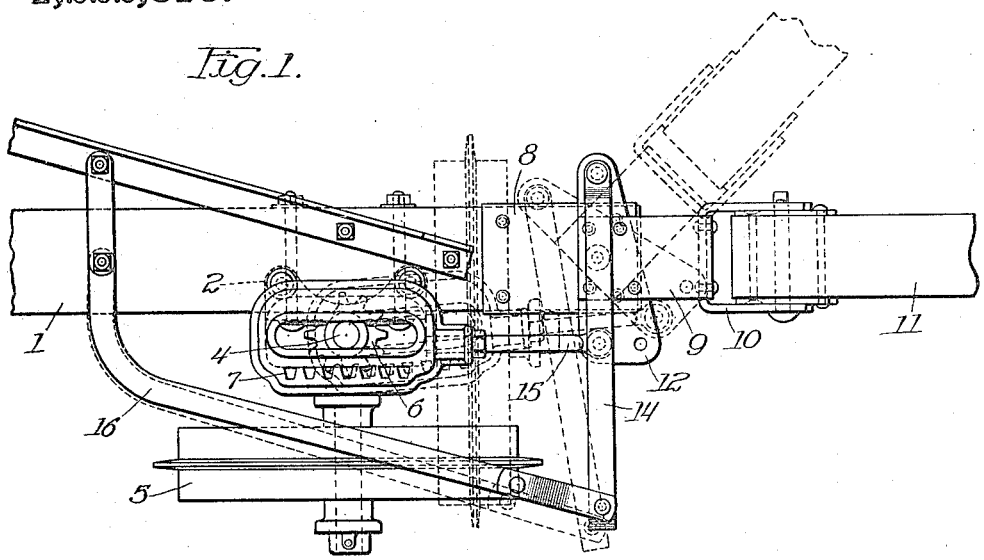
Figure 2:
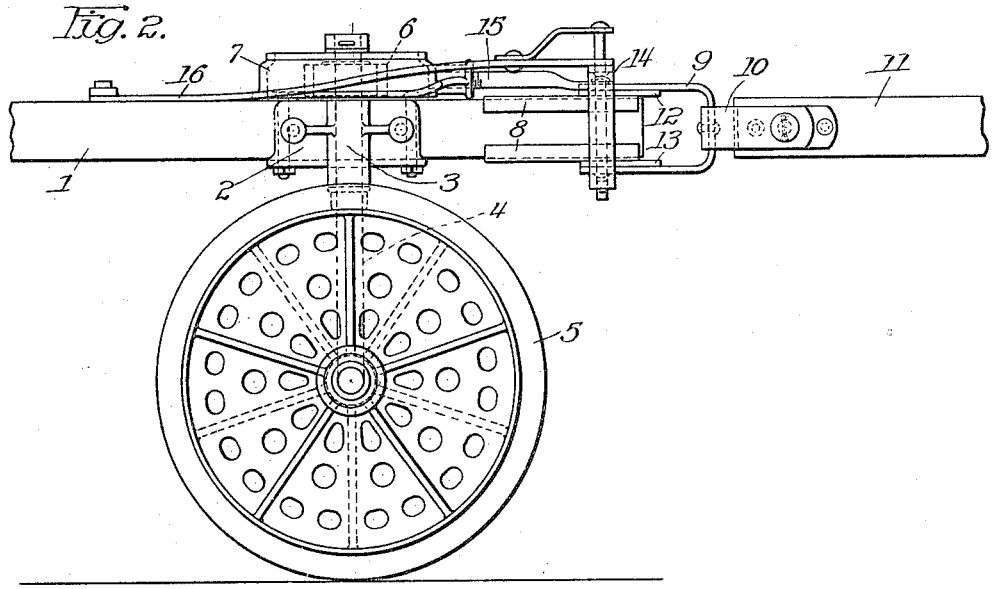

Figure 1 is a top plan view of a tongue truck having my invention embodied in its construction; and Fig. 2 is a side elevation of Fig. 1.

Referring to the drawings, 1 represents a support shown herein in the form of a relatively fixed short tongue that may be connected with a harvester or other implement, 2 a bracket member secured to the tongue and having integral therewith a vertically arranged sleeve 3, in which is journaled a wheel supporting member 4, having a truck wheel 5 journaled thereon, and 6 represents a pinion secured to its upper end and meshing with a slidable toothed rack, or wheel actuating member, 7 disposed longitudinally on the tongue. 8 represents upper and lower angle plates secured to the front end of the tongue 1, 9 a U-shaped member pivotally connected with the tongue 1, swinging laterally thereon, and having secured thereto a U-shaped member 10 that is pivotally connected with the rear end of a steering tongue 11 in a manner permitting a swinging movement of the latter in a vertical plane.

Secured to the rear end of the member 9, upon its upper and lower sides, are transversely disposed plates 12 and 13, respectively, having pivotally connected at one end thereof a laterally disposed draft member 14. 15 represents an adjustable link connection between the opposite end of this plate 12 and the toothed rack 7. 16 represents a draft member having its rear end pivotally connected with the tongue 1 and its front end with the opposite end of the draft member 14.

In operation, when the steering tongue 11 is swung rearwardly, as shown by dotted lines in Fig. 1, the plate 12, through its adjustable link connection 15 with the toothed rack 7, operates as a lever to move the rack longitudinally and rotate the wheel supporting member about its axis and turn the wheel through a greater angle than the steering tongue moves, and the associated parts of the mechanism may be so proportioned as to turn the wheel through any desired angle relative to the movement of the steering tongue.

Having shown and described a preferred form of my invention, I do not wish to confine it to the precise details of construction as shown, as many minor changes may be made in form and proportions of parts without departing from the spirit of my invention.

What I claim as my invention, and desire to secure by Letters Patent, is:

1. In a tongue truck, a support, a laterally swinging tongue carried thereon, and a wheel actuating rack member pivotally connected to said tongue and reciprocable thereby in a path substantially parallel with said support.

2. In a tongue truck, a support, a laterally swinging tongue pivoted thereon, a wheel carrying member journaled on said support, and means connected to said tongue and longitudinally reciprocable with respect to said support for turning the wheel carrying member in its bearings.

3. In a tongue truck, a support, a laterally swinging tongue pivoted thereon, a wheel support journaled on said support, and a reciprocatory slotted member pivotally connected to said tongue and movable thereby in a path substantially parallel with said support having its slotted portion operatively connected to said wheel support.

4. In a tongue truck, a support, a laterally swinging tongue pivoted thereon, a wheel support journaled on said support, and means including a longitudinally movable rack disposed parallel to said support and operatively connected directly to said tongue and wheel support for transforming an angular movement of the former into a rotary movement of the latter.

5. In a tongue truck, a support, a laterally swinging tongue pivoted thereon, a slotted wheel actuating member pivoted to said tongue and reciprocable thereby in a path substantially parallel to the line of draft, a wheel support journaled on said support, and means extending into the slot in said member for transforming a reciprocatory movement thereof into a rotary movement of said wheel support.

6. In a tongue truck, a support, a laterally swinging tongue pivotally connected thereto, a rack pivotally connected to said tongue and reciprocable thereby in a path substantially parallel to the line of draft, a wheel support journaled on said frame, and a pinion operatively connected to said wheel support and meshing with said rack.

7. A tongue truck including, in combination, a relatively fixed tongue, a wheel supporting member journaled vertically on said tongue, a pinion secured to said wheel supporting member, a slidable toothed rack engaging with said pinion, a steering tongue pivotally connected with said fixed tongue in a manner permitting it to swing laterally, and a link connection between said steering tongue and said toothed rack.

8. A tongue truck including, in combination, a relatively fixed tongue, a vertically disposed bearing sleeve secured to said tongue, a wheel supporting member journaled in said sleeve, a pinion secured to said wheel supporting member, a longitudinally movable toothed rack engaging with said pinion, a steering tongue pivotally connected with said fixed tongue in a manner permitting it to swing laterally, and an adjustable link connection between said steering tongue and said toothed rack.

9. In a tongue truck, a support, a laterally swinging member thereon, a wheel actuating member pivotally connected to said member at one side of its pivot and reciprocable thereby in a path substantially parallel to said support, a transversely disposed member pivotally connected to said first mentioned member on the opposite side of its pivot, a coöperating member pivotally connected to the free end of said transverse member and in turn pivotally connected to said support, a wheel journaled on said support, and operative connections between the same and said wheel actuating member.

10. In a tongue truck, a support, a laterally swinging member pivotally mounted thereon, a reciprocatory wheel actuating member disposed substantially parallel to said support and pivotally connected to said laterally swinging member at one side of the pivot of the latter, a wheel journaled on said support, operative connections between the same and said wheel actuating member, flexible laterally disposed draft connections, and operatively connected to said support and connected to said laterally swinging member on the opposite side of its pivot from said wheel actuating member.

11. A tongue truck including, in combination, a relatively fixed tongue, a vertically disposed bearing sleeve secured to said tongue, a wheel supporting member journaled in said sleeve, a pinion secured to said wheel supporting member, a longitudinally movable toothed rack engaging with said pinion, a steering tongue pivotally connected with said fixed tongue in a manner permitting it to swing laterally, a transversely disposed plate secured to said steering tongue, a laterally extending draft member having one end pivotally connected with one end of said plate, a draft member connecting the opposite end of said laterally extending draft member with said fixed tongue, and a link connection between the opposite end of said plate and said toothed rack.

In testimony whereof I affix my signature, in the presence of two witnesses.

JOHN A. STONE.

Witnesses:
J. W. LINDQUIST,
F. D. HARPER.

Copies of this patent may be obtained for five cents each, by addressing the "Commissioner of Patents, Washington, D. C."